United States Patent [19]

Huber

[11] 4,445,028

[45] Apr. 24, 1984

[54] UNIDIRECTIONAL CODE FOR INTERACTIVE MAP SYSTEM

[75] Inventor: William A. Huber, Sea Girt, N.J.

[73] Assignee: The United States of America as represented by the Secretary of the Army, Washington, D.C.

[21] Appl. No.: 386,865

[22] Filed: Jun. 10, 1982

[51] Int. Cl.³ .............................................. G06K 7/10
[52] U.S. Cl. ..................................... 235/472; 235/462; 235/494
[58] Field of Search ............... 235/494, 456, 462, 495, 235/493, 463, 470, 471, 472; 250/555, 556, 557, 558

[56] References Cited

U.S. PATENT DOCUMENTS

| | | | |
|---|---|---|---|
| 3,052,800 | 9/1962 | Miller | 250/556 |
| 4,110,610 | 8/1978 | Mueller et al. | 250/231 R |
| 4,143,267 | 3/1979 | Johnson et al. | 250/231 R |

FOREIGN PATENT DOCUMENTS

| | | | |
|---|---|---|---|
| 55-82919 | 6/1980 | Japan | 235/462 |
| 739575 | 6/1980 | U.S.S.R. | 250/556 |
| 744659 | 6/1980 | U.S.S.R. | 250/556 |
| 811305 | 3/1981 | U.S.S.R. | 250/556 |
| 813478 | 3/1981 | U.S.S.R. | 250/556 |

*Primary Examiner*—Harold I. Pitts
*Assistant Examiner*—Robert Lev
*Attorney, Agent, or Firm*—Robert P. Gibson; Jeremiah G. Murray; Anne Vachon Dougherty

[57] ABSTRACT

A system for plotting information on maps and reading information therefrom comprising maps which have machine-readable codes on the backs thereof arranged to indicate the coordinates of the map. A stylus is adapted to be moved over the map surface to read the map coordinates by sensing the codes thereon. The novel unidirectional codes comprising code bars all extending in the same direction, permit the use of simplified code sensing apparatus.

8 Claims, 4 Drawing Figures

UNIDIRECTIONAL CODE FOR INTERACTIVE MAP SYSTEM

The invention described herein may be manufactured, used, and licensed by or for the Government for governmental purposes without the payment to me of any royalties thereon.

BACKGROUND OF THE INVENTION

The invention relates to a data transmission and recording system and more particularly to such a system designed to facilitate the exchange and recording of tactical military information between military units and to permit such information to be quickly and accurately plotted on maps. The system is interactive in that the information can flow in two directions, for example, from a higher echelon such as a command and control center to a field unit such as a company, using existing communications facilities; and other map information can be transmitted back to the command and control center using the same transmission facilities and the encoding apparatus of the present invention.

The system includes a processor module at the higher echelon which functions as an interface between the central processor of the higher echelon's computer and the communications system over which the map data is transmitted, and a field processor at the tactical field unit which interfaces with the communications channel and the stylus. The stylus is a device which is moveable by hand over the surface of an encoded map to locate the coordinates thereon at which data is to be plotted and for transmitting back to the processor module map information relating to tactical operations. The data sent to higher echelons is stored for later use and can be applied to display type maps and can be re-transmitted to other field units, if necessary, using the system of the present invention.

The incoming map data can be temporarily stored in the field processor and plotted at the field operator's convenience. The map data includes digitally coded map coordinates corresponding to the location on the map at which data is to be plotted. The maps are divided into a plurality of relatively large square map elements or mels and each mel is assigned a digital code according to its location along the x and y axes. The x and y coordinates of each mel are encoded on the back of the map in binary digital form, for example by printing two binary bar codes thereon in magnetic ink. The stylus includes a coordinate code sensor which can read the mel codes as the stylus is moved over the map surface. The stylus is electrically connected to the field processor and it includes a digital display of the desired map coordinates. When the stylus has been moved to a proper coordinate, the display for that coordinate will indicate that the proper coordinate has been reached, for example by blinking.

Since greater resolution is desired than is practical with a hand-operated stylus and the relatively large mels, each mel is further subdivided into a plurality of sub-mels, and the system is designed so that the operator locates the proper mel and one coordinate of one sub-mel as described above by hand, and then the other coordinate of the proper sub-mel is located by means of a template and light emitting diode (LED) system attached to the stylus and electrically operated by several of the binary digits of lesser significance read out of the field processor. This two stage system permits high resolution which would be otherwise impractical in a hand operated system.

The map coordinate sensors or transducers may take any one of numerous forms, however all comprise means to automatically sense the digital map mel codes and are capable of performing this function when moving across the map or when stationary. The underside of the stylus includes one or more magnets. The magnetic fields produced thereby are concentrated in the magnetic ink of the mel code bars to facilitate the reading thereof by the coordinate sensors.

The present invention is an improvement on a similar interactive map information exchange system and method described and claimed in a co-pending application by the present inventor, entitled INTERACTIVE MAP INFORMATION SYSTEM U.S. Pat. No. 4,420,682. The improvement of the present invention comprises the use of unidirectional map codes rather than the use of two orthogonal map codes to identify the x and y coordinates of each mel as well as one of the coordinates of the sub-mel. This unidirectional code simplifies somewhat the apparatus required and permits the plotting and reading of information over a larger area of the map.

SUMMARY OF THE INVENTION

The present invention provides for high accuracy, high resolution and high speed plotting and reading of information to and from maps by the use of a data reduction technique in which the digital code representing a map coordinate contains a sufficient number of bits, for example nine binary bits, to permit a resolution of 512 lines along each orthogonal map coordinate. This high resolution results in 262,144 square map elements which would be approximately 55 mils or 1/18 of an inch on a side for a typical map of $28\times 28$ inches. Such a mel is too small to contain the required coordinate coding and also it would be difficult for an operator to locate the proper mel by manually moving a code sensor over such a coded map even if it could be coded to this resolution. To circumvent these difficulties, the present invention provides a system wherein the map is divided into much larger mels, for example, each of the x and y map axes may be divided into 16 equal parts. This results in 256 square mels. For the $28\times 28$ inch map mentioned, each of these mels is then almost 2 inches on a side. Since 16 is $2^4$, four binary digits are necessary to specify each of the x and y coordinates of each such mel. These four binary digits as well as additional digits, as explained below, are encoded in magnetic ink on the back of the maps to facilitate automatic reading thereof by the coordinate code sensor which is part of the manually operated stylus. The binary code may consist of magnetic ink bars printed on the back of the map within each mel. Two arrays of these code bars indicating the x and y coordinate of the mel are located within each mel.

Each mel is divided into a large number of sub mels to achieve the aforementioned 512 line resolution. For example, each of the 256 mels mentioned may be divided into 1024 sub mels. This means that each coordinate of each mel is sub-divided into 32 parts, requiring a five bit binary number to specify the location of each of the x and y sub mels. Thus a nine bit binary number is required to fully specify each of the x and y coordinates to be plotted or read.

Each mel includes a four bit x mel code and a four bit y mel code comprising vertically disposed bars which together occupy approximately two thirds of the area of the mel. The remaining one third comprises a binary bar code which identifies the y sub mel as one of 32 different levels from the bottom to the top of the mel. A template comprising an array of 32 or more holes is attached to the stylus and is used, in conjunction with an adjacent array of indicators or lights to identify and plot the x sub mel within the mel.

The stylus is manually moved over the coded map and the code sensors therein automatically read the map's codes and compare them to the received digital code stored in the field processor corresponding to a pair of coordinates at which information is to be plotted. When the position of the stylus matches the stored code, the data point can be plotted, with the aid of the template. In transmitting data points to other units, the procedure is reversed and the coordinates of points of interest are automatically read and transmitted.

The code bars may be printed on the backs of the maps in magnetic or metallic ink which is readable by the code sensors of the stylus.

All of the coding bars extend in the same direction which in the illustrative example to be shown and described is vertically, thus resulting in unidirectional coding with its attendant advantages. The vertical code bars can be read by a single horizontal array of code sensors.

It is thus an object of the invention to provide improved apparatus capable of accurately plotting information received in binary coded form on maps by printing coordinate codes on said maps, which codes can be automatically read by coordinate code sensors, and wherein said received binary code is compared to the code read by said sensors to indicate the proper location for the plotting of said information.

Another object of the invention is to provide improved apparatus capable of plotting information on maps with high accuracy from received binary digital information comprising a plurality of binary code words indicative of the data points to be plotted, and wherein the said binary code words are split into two groups, the first group comprising the more significant bits of said words and said first group being used inconjunction with a manually operated stylus including a coordinate code sensor and unidirectional coordinate codes printed on said maps to locate a relatively large map element or mel in which said data points are located, and further automated means to use the second group of the binary bits of lesser significance to accurately locate said data points within said mel by means of a further unidirectional code within each said mel and a template attached to said stylus.

These and other objects and advantages of this invention will become apparent from the following detailed description and the drawings.

DETAILED DESCRIPTION OF A PREFERRED EMBODIMENT

Figure 1:
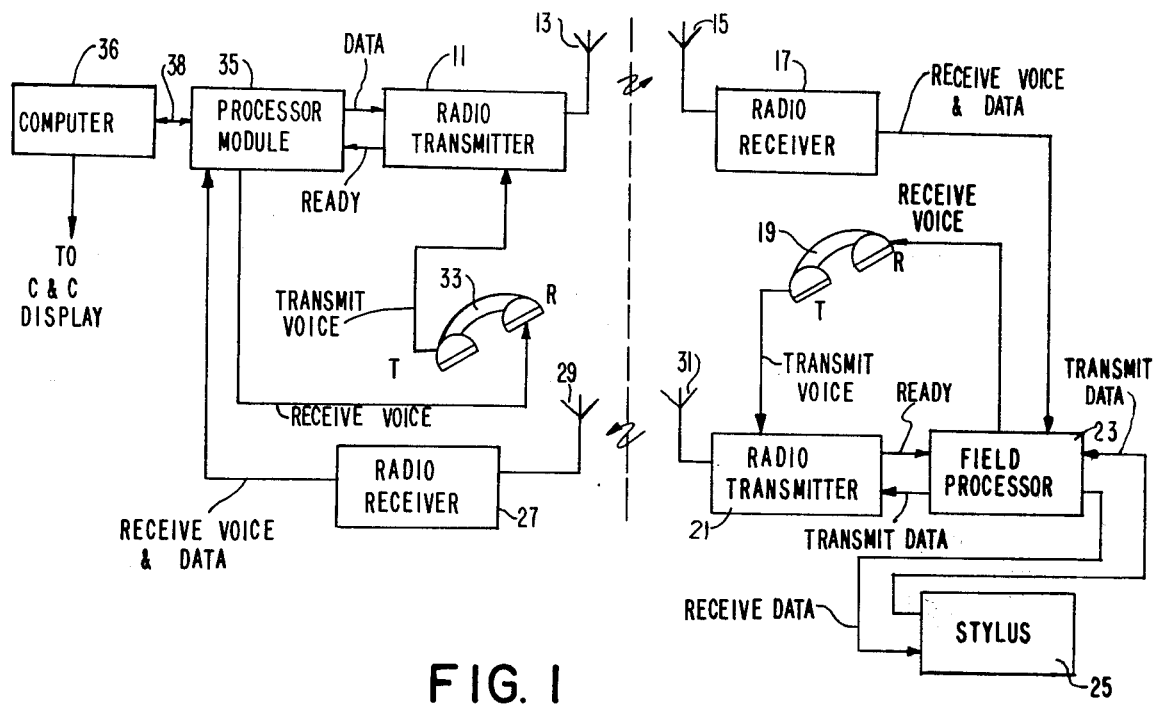
FIG. 1 shows how the system of the present invention can be integrated into an existing voice communications system.

FIG. 1 illustrates how the system of the present invention can be integrated into an Army voice communications system so that map information relating to tactical operations may be exchanged between forward area field units and higher echelons which are equipped with automatic data processing facilities. In FIG. 1 the circuitry to the right of the dashed line comprises that at the forward area tactical unit and that to the left the higher echelon, usually called a command and control center. The radio transmitters 11 and 21, the radio receivers 17 and 27 and the associated handsets 19 and 33 are part of the aforementioned duplex voice communications system. The function of the processor module 35 is to interface the digitally encoded display data with the communications system, taking into consideration such characteristics as time sharing, routing, data rates, system bandpass, logic, waveforms, etc. This interface must be two way so that the field operators can both receive and transmit to the higher echelon computer 36, as indicated by the double headed lead 38 between the computer 36 and processor module 35. The map data in the processor module is fed to the transmitter 11 during idle periods in the voice communication function, in response to a control signal on the lead labelled "ready". The map data received by receiver 17 together with the voice signals are applied to field processor 23 which applies the voice signals to handset 19 and stores the map data for application to the stylus 25 over the lead marked "receive data". In returning data to the higher echelon, the flow of data is reversed from the stylus to the field processor and transmitter 21 via the "transmit data" leads, thence to receiver 27, processor module 35 and computer 36. The functions of the field processor are storage of map coordinate data, formatting the data for display and furnishing the necessary logic so that the operators can interact with the system with the aid of stylus.

The aforementioned data reduction technique (or the two stage plotting and reading system) reduces the 262,144 elementary areas of a 512 line × 512 line resolution coordinate system to 256 mels (or 16×16 lines). This reduction is automatically accomplished by the field processor. The processor logic divides each of the 512 vertical and horizontal lines into 16 groups of 32 lines each. Each of the 16 groups derived from the 512 vertical lines is assigned a four bit code starting with (0000) and ending with (1111). This code group forms the x axis coordinate of the array of 256 mels. Each group of 32 horizontal lines is binary coded into 16 binary numbers to form the y axis coordinate of the mel array. The five remaining bits of the nine bit data code are retained in the field processor memory for later recall and use by the operator to automatically subdivide each mel into 1024 units or sub mels, thereby providing the desired 512×512 line resolution.

Figure 2:
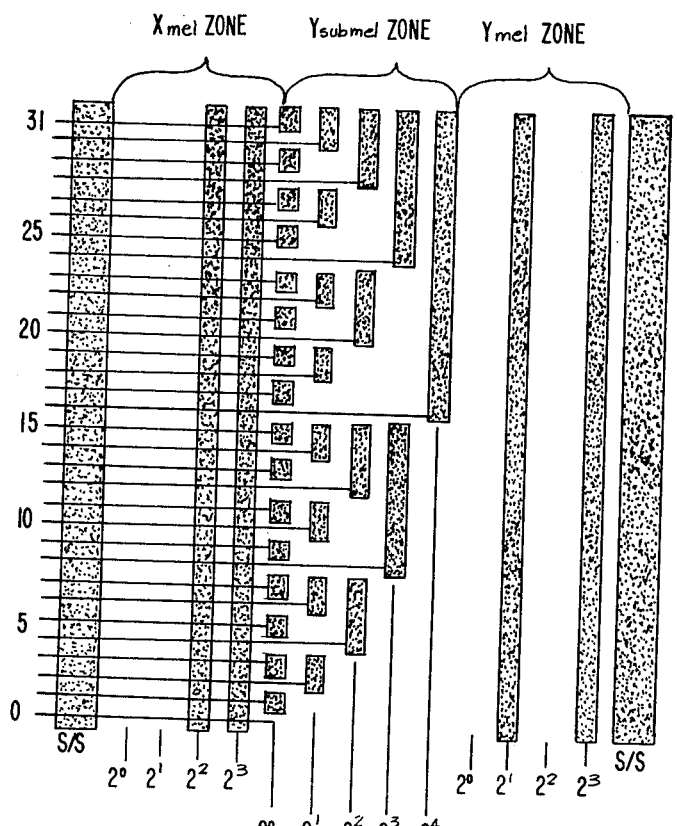
FIG. 2 shows the unidirectional code of the invention as applied to a single mel of a coded map.

FIG. 2 shows the unidirectional coding pattern of a single mel. As can be seen, all of the coding bars within this mel extend in the same direction, the vertical direction. The left edge of the square mel includes a start/stop bar, labelled s/s, which has a width of approximately twice that of the information bars within the mel. This start/stop bar defines the beginning of the mel. The remainder of the mel is equally divided into three coding zones, namely the x mel zone, the y sub mel zone, and the y mel zone, as indicated at the top of the mel. These zones extend vertically parallel to each other, as shown. The x mel zone comprises space for four vertical code bars which extend from the top to the bottom of the mel. These spaces are labelled $2^0$, $2^1$, $2^2$, and $2^3$ along the lower edge of the x mel zone of FIG. 2. These four spaces thus provide the binary code to identify the four bit binary number required to identify the 16 different x coordinates of the 256 mels of the code system of the present example. In FIG. 2 the code spaces for the digits $2^2$ and $2^3$ are occupied by printed code bars, indicating binary 1s and the remaining spaces are blank, indicating binary 0s. Thus the x mel coordinate is 12.

An identical y mel zone occupies the right one third of the remaining mel area. As shown, this zone is coded by a pair of code bars in the $2^3$ and $2^1$ positions to indicate the y mel as 10.

The middle one third of the remaining area of the mel is divided into 32 different levels from top to bottom and each of these 32 levels are coded to indicate a different one of the 32 y sub mel coordinates into which each of the mels is divided. The y sub mel coding is the same for each mel. The 32 levels of this coding zone are indicated by the 32 horizontal lines which are number 0, 5, 10, etc. along the left side of the mel. As shown along the lower edge of the y sub mel zone, this zone is divided into five coding spaces labelled $2^0$ through $2^4$, as required to specify the 32 different y sub mel coordinates. The $2^4$ code space includes a code bar extending for half the height of the mel starting at the top. The $2^3$ code space includes two bars of one quarter the mel height arranged as shown. Each of the binary digit spaces of lesser significance has double the number of code bars than the digit of next higher significance, but of half the length thereof. The y sub mel code is read horizontally along any one of the 32 lines defining the 32 levels. It can be seen that at the first or 0 level there are no code bars in the y sub mel zone, indicating 0 whereas in the last or 31 level there are code bars in all of the five coding spaces, indicating this y sub mel as 31. It can be seen from this coding pattern that each of the 32 binary codes represent the ten based numbers 0–31, progressing from the bottom to the top of the y sub mel zone.

It is apparent that this unidirectional coding pattern permits the x mel, the y sub mel and the y mel to be read by a code sensor which comprises a single horizontal linear array of code transducers long enough to span the width of the mel.

Figure 3:
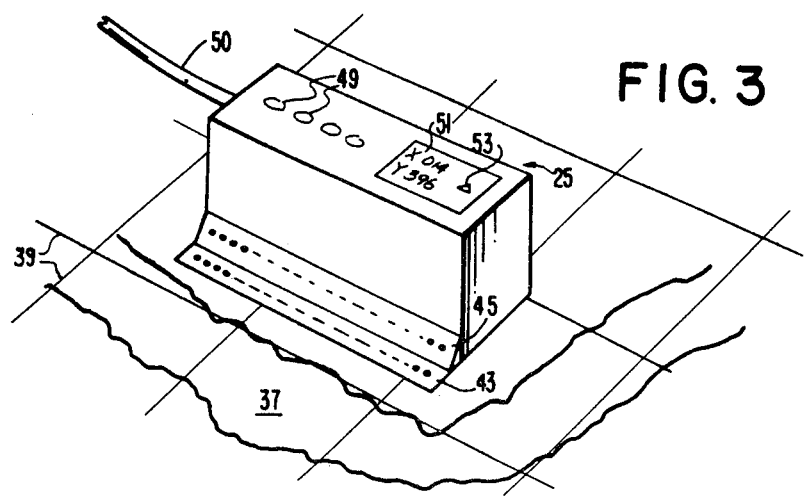
FIG. 3 is a pictorial view showing how the stylus is moved over the surface of a map during the plotting and reading of data points.

FIG. 3 is a pictorial view showing how the stylus 25 is moved over the surface of the map 37 to locate the proper data points for the plotting and reading functions. The stylus includes a display of the desired map coordinates, 51, which shows both the x and y coordinates of the data point, in base 10 numbers from 0–511. The triangular symbol 53 indicates the type of activity at the data point. For example, the triangular symbol may indicate "enemy tanks". Other symbols would have other meanings. The operator may mark such symbol on the map after the data point is plotted. The symbols form part of the data received by the field processor. The dials or buttons 49 are used for controlling the operation of the stylus. The stylus includes a coordinate code sensor and may include magnets which will be shown and described in connection with FIG. 4. The map includes the coordinates 39.

The array template 43 is attached on one lower edge of the stylus and a linear array of lights 45 adjacent thereto are automatically illuminated to accurately locate the x sub mel coordinate within the larger mel by using the five binary digits temporarily retained in the field processor memory during location of the mel and the y sub mel by manual stylus operation. The operation of the template will be explained on connection with FIG. 4. An electrical cable 50 is connected to the stylus.

Figure 4:
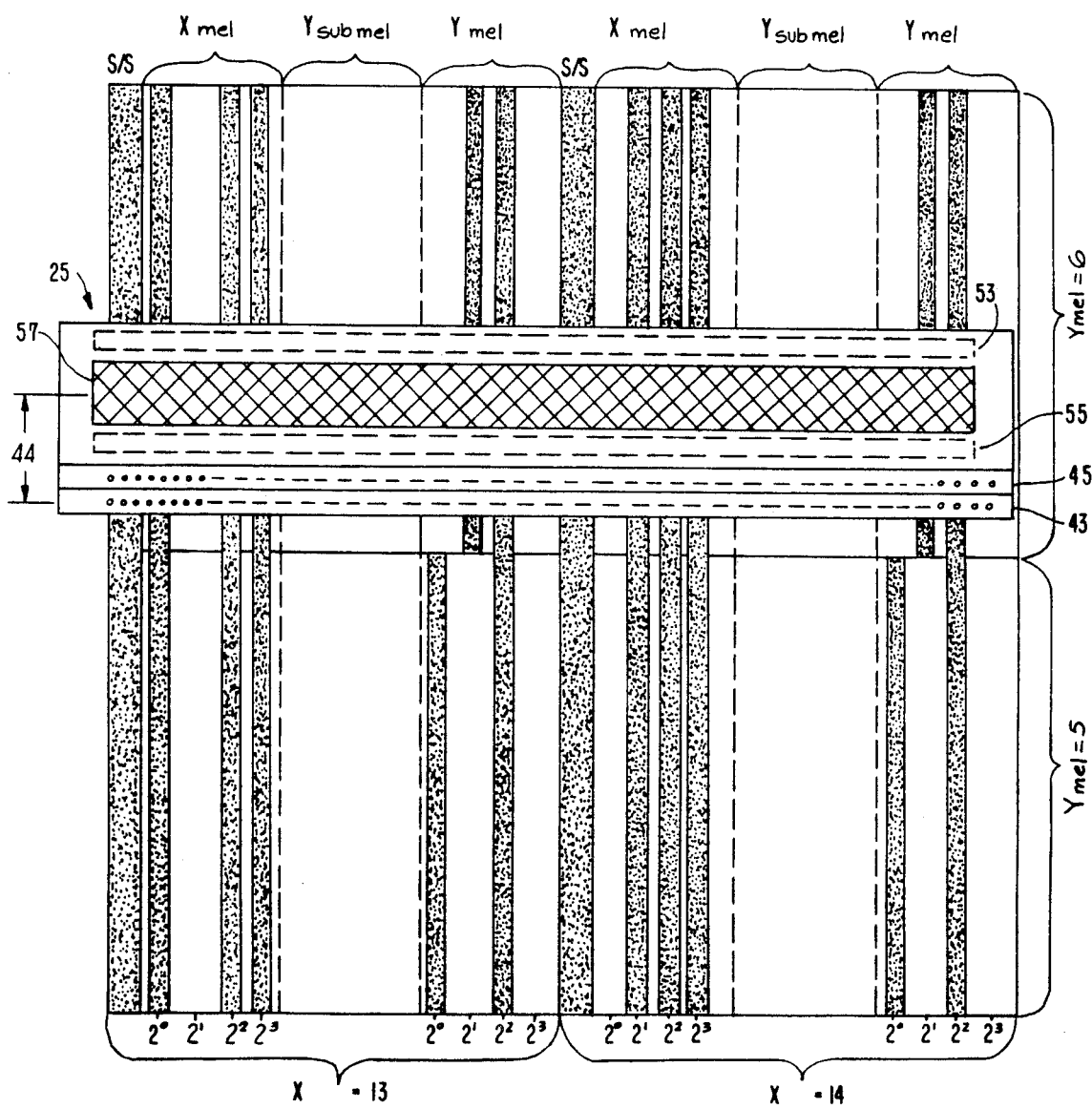
FIG. 4 is a plan view of four adjacent map mels with the stylus shown thereon.

FIG. 4 is a plan view of a portion of a coded map comprising four adjacent mels, showing the coded x and y mel codes, which are on the back of the map. This view also shows the stylus 25 resting on the map surface. Some of the significant functional components on the underside of the stylus are indicated in this drawing.

The four mels shown have x and y mel coordinates of 13 and 5, 13 and 6, 14 and 5 and 14 and 6 and the x and y mel zones of each of these mels are so coded. All of the x mels in a vertical line have the same coding. Since the y sub mel coding would be the same for each mel, as illustrated in FIG. 2, this coding has been omitted for clarity. The stylus 25 may comprise on its underside a pair of magnets 53 and 55 located on either side of the linear array of code sensors, 57. The magnets provide a magnetic field within the magnetic ink code bars to facilitate the reading thereof by the sensors. The code sensors or transducers may take any one of numerous forms, however all must comprise means to automatically sense the digital mel and sub mel codes printed on the backs of the maps. The sensors should have this capability while stationary or when moving across the map. The coordinate code sensors may comprise a surface acoustic wave device in which a surface acoustic wave is launched down a piezoelectric crystal which is oriented normal to the array of code bars to be read. The surface of the crystal has a pattern of conductors printed thereon and the stylus magnets concentrate magnetic flux in the vicinity of the magnetic ink code bars. As the surface wave propagates down the crystal, the printed conductors are successively moved back and forth in such a way that a voltage will be induced therein if a code bar is under that portion of the crystal. The presence or absence of this voltage determines whether a binary 0 or 1 is read.

An alternate type of coordinate code sensor may comprise an array of electro-optical transducers adapted to read the magnetized code bars. Such transducer may comprise a solution such as Bitter's solution which changes optical density in the presence of a magnetic field. Light beams are reflected from the solution to phototransistors and the intensity of the reflected light is indicative of the presence or absence of a magnetized code bar on the underside of the map at that location.

A third type of code sensor comprises a linear array of toroidal iron cores with air gaps therein. The presence of the magnetic ink code bars adjacent the air gap will cause an increase in inductance of a coil wound on the toroid. This type of sensor requires no magnets since the coil is part of a series resonant circuit which magnetizes the air gap. The presence or absence of a code bar is determined by the phase shift of the current or voltage in the series resonant circuit.

Code sensors of the types described are shown and described in greater detail in the aforementioned co-pending application.

As is apparent from FIG. 2, there are 13 code spaces horizontally across each mel in the three zones, plus two spaces in the start/stop bar. The individual transducers of the array of code sensors 57 must have a spacing such that any two adjacent transducers of the array will have a spacing less than that of the start/stop bars, since a binary 1 read by two adjacent transducers is indicative of the presence of a start/stop bar. This spacing results in 29 evenly spaced transducers across each mel. In order to provide a margin for error in the positioning of the stylus, it has been found advantageous to make the code sensor 57 almost long enough to span two mels. Thus in the present illustrative example, 56 evenly spaced transducers could be used. With such a code sensor array, only one mel can be read at a time and as soon as the two leftmost transducers of the array 57, as viewed in FIG. 4, are moved off of the start/stop bar of the mel in the upper left as a result of stylus movement to the right, the right half of the code sensor array would be in a position to read the codes of the adjacent mel in the upper right of the four mel group shown in FIG. 4. When the code sensor array encounters a start/stop bar, it then reads the next four code spaces as the x mel, the next five code spaces as the y sub mel and the final four as the y mel.

In operation, when it is desired to plot a data point, the stylus is moved by trial and error along one of the map axes to determine one of the mel coordinates. For example, if the stylus is moved horizontally across the map the code sensors would sequentially read each x mel. The coordinates 51 of the desired data point would be displayed on the top of the stylus as well as the symbol 53, as shown in FIG. 3. This information would come from the field processor. As the x mels are scanned in this way, the codes are read and sent back to the field processor for comparison to the x mel of the data point to be plotted. When this is encountered the x coordinate display 51 may blink on and off. The stylus is then moved vertically parallel to the y axis until the desired y mel is located in the same fashion indicated by blinking of the y coordinate display 51. The stylus is then slowly moved vertically within the desired mel to locate the proper y sub mel. This is done by comparing the map y sub mel code to the desired corresponding code in the field processor. When this occurs, one of the LED's 45 will become illuminated, indicating that the template is to be used to plot the data point, as explained below.

As stated above, the linear template 43 is used to plot the proper x sub mel. This template is shown attached to the lower broad side of the stylus so that it is flush with the underside of the stylus and thus resting directly on the map. The template may comprise a sheet of transparent plastic with a linear array of holes therein with the hole spacing the same as that of the x sub mels, which in this case is one thirty second of the width of the mel. The array of LEDs, 45, is mounted on a sloping portion of the stylus just above the template, the spacing and number of the array of LEDs matches that of the template array. After the proper x mel and y mel and sub mels have been located as explained above, one of the LEDs will be illuminated in response to a signal from the field processor to indicate the proper x sub mel. The operator can mark the map through the template hole opposite the illuminated LED to plot the desired data point. The symbol representing the activity at that point, for example the triangle 53 shown in FIG. 3 can then be applied to the map near the plotted data point.

As can be seen from FIG. 4, the array of holes of template 43 is vertically displaced by the distance indicated by numeral 44 from the center of the array of code sensors 57, thus the y coordinates read by the array 57 will always be different from the y coordinate as plotted by the template. This difference can be compensated for if the distance 44 is made an integral number of y sub mels and the y codes read by the code sensors have subtracted therefrom the number of such y sub mels, before the y coordinates are compared to the received y coordinate codes stored in the field processor.

In transmitting data points to remote terminals such as a higher echelon, the stylus would be placed over the data point to be read or transmitted, with one of the template holes lined up with the data point. One of the controls 49 on the stylus, shown in FIG. 3, would be a button arranged to step the illuminated LED of array 45 until the LED opposite the data point was illuminated. At this time another button labelled "read" would be pushed and the code sensors would automatically read the map codes and the position of the illuminated LED to send the coordinates of the data point to the field processor for transmission therefrom. A further signal would be sent indicating the type of activity at that point. The transmitted codes would be modified to compensate for the distance 44 from the data point to the code sensor array.

In addition to the simplified apparatus of the present invention compared to that shown in the aforementioned co-pending application, the present unidirectional coding system has the advantage of being able to plot and read data points over almost the entire map area. In the old art, with the x and y mel codes applied to each mel with orthogonal x and y bar codes as in the co-pending application, each mel is totally enclosed by start/stop code bars. These cause blank spaces around the perimeter of each mel, since if either one of the two orthogonal arrays of code sensors happen to be over one of these start/stop bars, the coordinate codes cannot be read. The present invention has no blank spaces caused by the start/stop bars. When the stop/start bars are scanned normal to their lengthwise direction, as is done in the present invention, the bars do not cause a blank or a cessation of input; but, rather generate signals that indicate the start or finish of a coordinate locating zone.

While the invention has been described in connection with illustrative embodiments, obvious variations therein will occur to those skilled in this art. Accordingly, the invention should be limited only by the scope of the appended claims.

I claim:

1. Apparatus capable of easily plotting and reading data points onto and from maps, comprising; maps which are divided into a plurality of map elements or mels, with each mel being coded to indicate the x and y coordinates thereof, each said mel being divided into a further plurality of sub mels, to which x and y sub mel coordinates are applied, each said mel being divided into three coding zones, two of which include digital machine readable bar codes to indicate the x and y mel coordinates of that mel and a third coding zone used to indicate a first of the two coordinates of the sub mel coding within said mel by means of machine readable bar codes, all of said bar codes comprising arrays of bars all extending in one direction; and a stylus adapted to be moved over the surface of said map and to read said bar codes by means of a single linear array of code sensors extending normal to the direction of said bar codes, said stylus further including a template attached thereto with a linear array of holes therein, said template adapted to plot or read the second of said two coordinates of the sub mel coding within said mel.

2. The apparatus of claim 1 wherein said arrays of bars comprising said bar codes extend parallel to the y axis of said maps, and said third coding zone indicating the first coordinate of the sub mel coding within each mel indicates the y sub mel coordinate by means of said machine readable code, and wherein an array of lights is provided adjacent to said template, with said array of lights being useful to indicate where x as the second of said coordinates of the sub mel coding is to be plotted or read as one of the holes in said template.

3. The apparatus of claim 1 wherein each data point to be plotted is indicated by a pair of received binary digital codes corresponding to the x and y coordinates of said data point, the x mel coordinate being indicated by a portion of a first digital word and the x sub mel coordinate by the remainder of said word, the y mel coordinate being indicated by a portion of a second digital word and the y sub mel coordinate by the remainder of said second digital word, and said apparatus further comprising circuitry for comparing the codes read by said stylus to said received binary codes.

4. A method of plotting data points on maps which are divided into mels having x and y coordinates and which are further divided into sub mels having x and y coordinates wherein the x and y coordinates of said data points are specified by means of a pair of binary words, comprising the steps of coding said maps into a plurality of mels with unidirectional bar codes therein indicating the x and y mel coordinates thereof plus a further bar code indicating the y sub mel coordinates of different portions of said mel, all of said bar codes extending parallel to the y axis of said maps, and reading said bar codes by means of a stylus which comprises a single horizontal linear array of code sensors adapted to simultaneously read the bar codes of an entire mel.

5. Improved means to plot and read information onto and from maps wherein the maps have the coordinates thereof encoded thereon in machine readable bar codes and the means include a movable stylus capable of reading said codes, wherein the improvement comprises said machine readable bar codes being comprised of unidirectional codes having bars all extending in the same direction and wherein said stylus comprises a single linear array of code sensors adapted to read said unidirectional codes.

6. The apparatus of claim 5 wherein said unidirectional code comprises coding bars all extending parallel to the y axis of said maps.

7. A unidirectional machine readable bar code for encoding elementary areas of maps or the like with multidirectional coordinates of said elementary areas, each said elementary area comprising a plurality of zones each containing a number of code bars, all of said code bars being of the same width and extending in the same direction, and a start/stop bar along one edge of said elementary area, said start/stop bar being wider than said code bars.

8. The code of claim 7 in which there are three zones, two of which are coded with the coordinates of said elementary area and the third of which is coded to indicate a plurality of different levels within said elementary areas.

* * * * *